(12) United States Patent
Raby et al.

(10) Patent No.: US 10,267,419 B2
(45) Date of Patent: Apr. 23, 2019

(54) PISTON WRIST PIN INSTALLATION TOOL AND METHOD

(71) Applicant: IMS SOLUTION, LLC, Bogart, GA (US)

(72) Inventors: Jacob Dean Raby, Cleveland, GA (US); Charles Lauren Navarro, Momence, IL (US)

(73) Assignee: IMS SOLUTION, LLC, Bogart, GA (US)

( * ) Notice: Subject to any disclaimer, the term of this patent is extended or adjusted under 35 U.S.C. 154(b) by 193 days.

(21) Appl. No.: 15/336,237

(22) Filed: Oct. 27, 2016

(65) Prior Publication Data
US 2017/0113336 A1    Apr. 27, 2017

Related U.S. Application Data

(60) Provisional application No. 62/246,899, filed on Oct. 27, 2015.

(51) Int. Cl.
| | |
|---|---|
| *F16J 1/18* | (2006.01) |
| *B25B 27/02* | (2006.01) |
| *B25B 27/04* | (2006.01) |
| *B25B 27/00* | (2006.01) |

(52) U.S. Cl.
CPC ............... *F16J 1/18* (2013.01); *B25B 27/023* (2013.01); *B25B 27/04* (2013.01); *F16C 2360/22* (2013.01); *Y10T 29/49233* (2015.01); *Y10T 29/49638* (2015.01)

(58) Field of Classification Search
CPC ............. Y10T 29/49948; F16B 13/065; F16B 13/066; F16B 13/0858; F16B 13/063; F16B 13/124; F16B 29/00; F16B 19/1072; F16B 35/06; B25B 31/00; B25B 27/04; B25B 27/023; F16J 1/18; F16C 2360/22
USPC .... 411/55, 60.1, 57.1, 60.2, 44; 29/888.011, 29/888.041, 888.05
See application file for complete search history.

(56) References Cited

U.S. PATENT DOCUMENTS

| | | | | |
|---|---|---|---|---|
| 6,052,896 | A * | 4/2000 | Howell, III | ............. B25B 27/14 29/402.08 |
| 9,222,251 | B2 * | 12/2015 | Espinosa | ............... E04B 1/4121 |
| 9,394,706 | B2 * | 7/2016 | Lin | .......... E04G 15/04 |

(Continued)

OTHER PUBLICATIONS

IMSSOLUTION-installation manual—May 2016.*

*Primary Examiner* — Christopher M Koehler
*Assistant Examiner* — Mahdi H Nejad
(74) *Attorney, Agent, or Firm* — Mitch Harris, Atty at Law, LLC; Andrew M. Harris

(57) ABSTRACT

An engine piston wrist pin installation tool, kit and method provide the ability to install a piston in an engine block while the corresponding piston rod is assembled to the crankshaft. The wrist pin aperture is first aligned with an access hole provided on the engine block, which may be performed by using a tapered alignment tool provided in the tool kit. A mounting flange configured for bolting to preformed holes in the engine block is first attached over the access hole, the alignment performed, and a tool including a cylindrical sheath that holds a wrist pin clip compressed and a rod that holds the wrist pin and clip is slid through a locking collar of the flange and secured in place. The rod is then pressed through the sheath to extend the wrist pin and wrist pin clip into the piston until the wrist pin clip snaps into place.

15 Claims, 6 Drawing Sheets

(56) References Cited

U.S. PATENT DOCUMENTS

| | | | |
|---|---|---|---|
| 2009/0199403 A1* | 8/2009 | Younger | F15B 13/0402 29/890.121 |
| 2013/0042473 A1* | 2/2013 | Imam | B25B 27/0035 29/888.011 |
| 2013/0067849 A1* | 3/2013 | Espinosa | E04B 1/4121 52/699 |
| 2014/0079496 A1* | 3/2014 | Cousineau | B23B 51/0045 408/81 |
| 2015/0167715 A1* | 6/2015 | Hakenholt | F16B 13/065 166/381 |
| 2016/0271764 A1* | 9/2016 | Huang | B25B 27/18 |

* cited by examiner

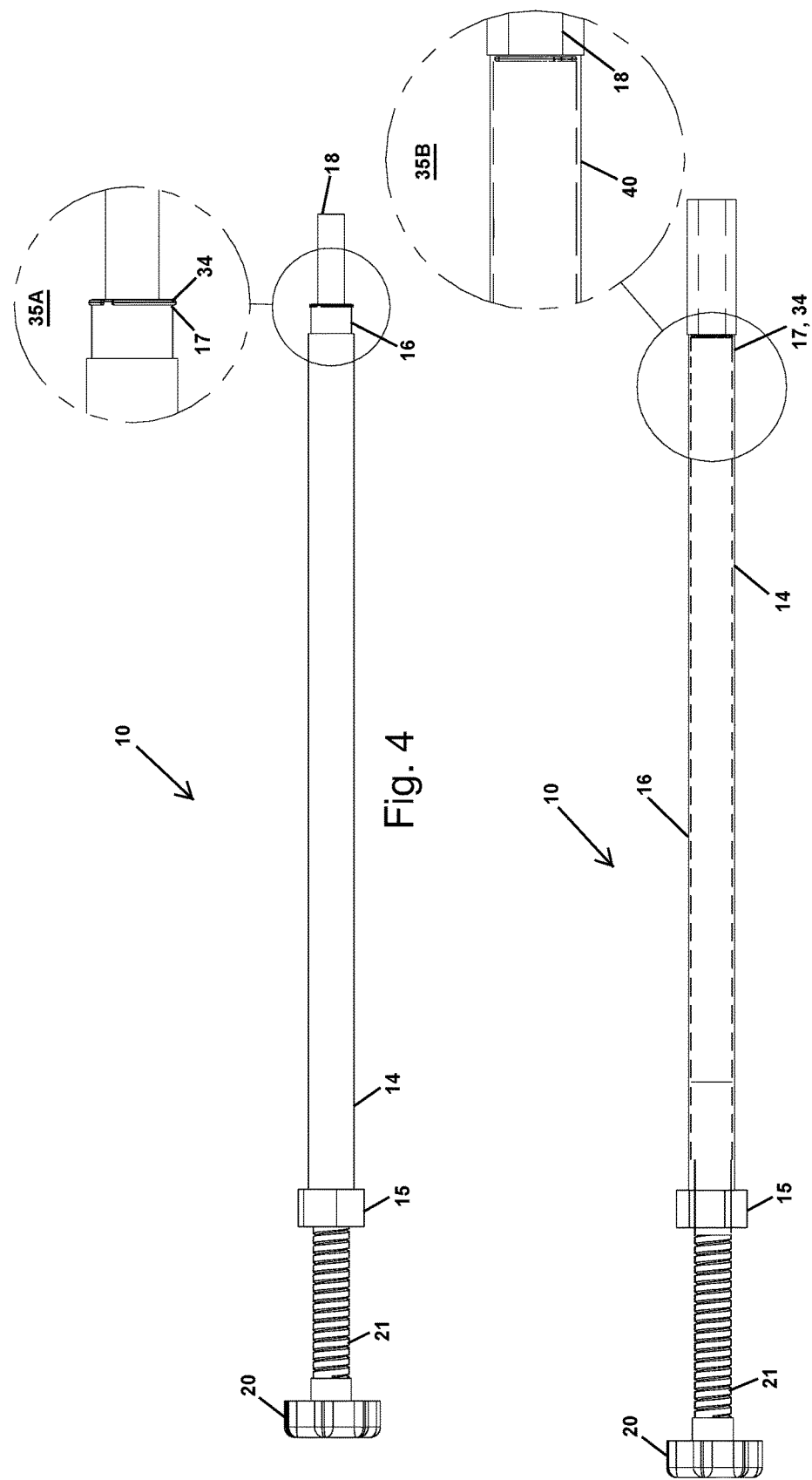

PISTON WRIST PIN INSTALLATION TOOL AND METHOD

This U.S. Patent Application claims priority under 35 U.S.C. § 119 to U.S. Provisional Patent Application Ser. No. 62/246,899 filed on Oct. 27, 2015.

BACKGROUND OF THE INVENTION

1. Field of the Invention

The present invention relates generally to engine refit tools, and more specifically, to techniques and tools for installing piston wrist pins and wrist pin clips with the piston installed in the engine.

2. Background of the Invention

In certain engines, in particular engines having opposed piston arrangements such as PORSCHE and some VOLKSWAGEN engines, a complete engine teardown must generally be performed when servicing pistons to replace the pistons or install rings, or when making modifications to the bore of the cylinders and pistons. (PORSCHE and VOLKSWAGEN are trademarks of Volkswagen AG.) Since the crankshaft is not accessed from the bottom, but from the center of the engine, access to installing fully assembled piston/rod assemblies is not available from the bottom of the engine, as can be done for other engine types.

The pistons in the above-described engines are typically pre-assembled to the piston rods using a wrist pin that fits through wrist pin apertures through the piston and rod and secured at each end by a wrist pin clip that expands to snap in a groove in the wrist pin apertures and that prevents the wrist pin from sliding with respect to the piston once the wrist pin is installed. The above assembly process is typically performed prior to attaching the rod to the crankshaft after sliding the piston into the cylinder from the ends of the engine.

Therefore, it is desirable to provide a method and tool for installing pistons to the rods while the rods are in the engine and after the rods are connected to the crankshaft.

SUMMARY OF THE INVENTION

The above objectives of providing installation of pistons in a horizontally-opposed engine while the rods are assembled to the crankshaft is provided in a method and tool for securing pistons within an engine by installing their wrist pins and wrist pin clips while the pistons are in the engine. The tool may be included in a tool kit that includes an alignment tool for aligning the wrist pin apertures of the cylinders and the rods.

The tool includes a flange that has a hole pattern matching a hole pattern of preformed mounting holes on an external face of a block of the engine, a hollow cylindrical sheath having an inner circumference less than a compressed outer circumference of an installed wrist pin clip, and a rod having a diameter less than an inner diameter of the cylindrical sheath and having an end portion sized to insert within an inner diameter of the piston wrist pin and a body portion sized to slide within the cylindrical sheath. The rod is insertable through the cylindrical sheath with the wrist pin and wrist pin clip fitted over the end portion with the wrist pin clip at a distal end of the body portion so that when the wrist pin is slid entirely within the piston, the wrist pin clip is released from the cylindrical sheath and expands to secure the piston wrist pin within the piston. The flange has an integral collar having an inner diameter greater than an outer diameter of the cylindrical sheath so that the cylindrical sheath is insertable through the collar to contact the wall of the piston so that the rod and the cylindrical sheath can be slid out from the collar with the secured piston wrist pin remaining installed in the engine. The outer diameter of the cylindrical sheath is less than a diameter of an access hole provided through an outside wall of an engine block of the engine, so that the cylindrical sheath can be inserted through the access hole and can be positioned so that a wrist pin aperture in a wall of a piston of the engine can be contacted by the cylindrical sheath and the wrist pin and wrist pin clip inserted into the access hole. An alignment tool having a tapered end and a mid section sized to fit the wrist pin aperture of the piston may be supplied in a kit with the parts of the tool, for use in aligning the piston with the access hole prior to installation of the piston wrist pin and wrist pin clip.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

FIG. 4 and FIG. 5 are side pictorial views illustrating pre-assembly of wrist pin installation tool 10 of FIG. 1, a wrist pin 40 and a wrist pin clip 34 during a piston wrist pin and wrist pin clip installation process.

DESCRIPTION OF ILLUSTRATIVE EMBODIMENT

The present invention includes tools and methods for installing piston wrist pins and wrist pin clips in pistons without removing the pistons and piston rods from the engine block. The tool includes a flange that mounts on an exterior surface of the engine block over an access hole with which the wrist pin aperture of the piston can be aligned and which is large enough to accommodate the piston wrist pin and the installation tool, which has a diameter slightly larger than the piston wrist pin. The tool includes a hollow cylindrical sheath that is secured by a collar on the flange and extended into the engine block until the wall of the piston surrounding the wrist pin aperture of the piston is contacted. The tool also includes a rod that is slid through the sheath and holds the wrist pin and a wrist pin clip prior to installation. The wrist pin is compressed to fit within the sheath and the wrist pin is fitted onto an end portion of the rod. When the rod is pressed through the sheath, the distal end of the rod pushes the wrist pin and finally the wrist pin clip into the piston aperture, so that the wrist pin clip expands to snap into the groove provided in the piston wall around the wrist pin aperture. The rod may include a U-shaped groove for holding the wrist pin clip in place while the wrist pin clip is compressed within the sheath. A tool kit including the tool may further include a tapered alignment tool that is used to position the wrist pin apertures through the piston and the corresponding piston rod in alignment with the collar of the flange.

Figure 1:
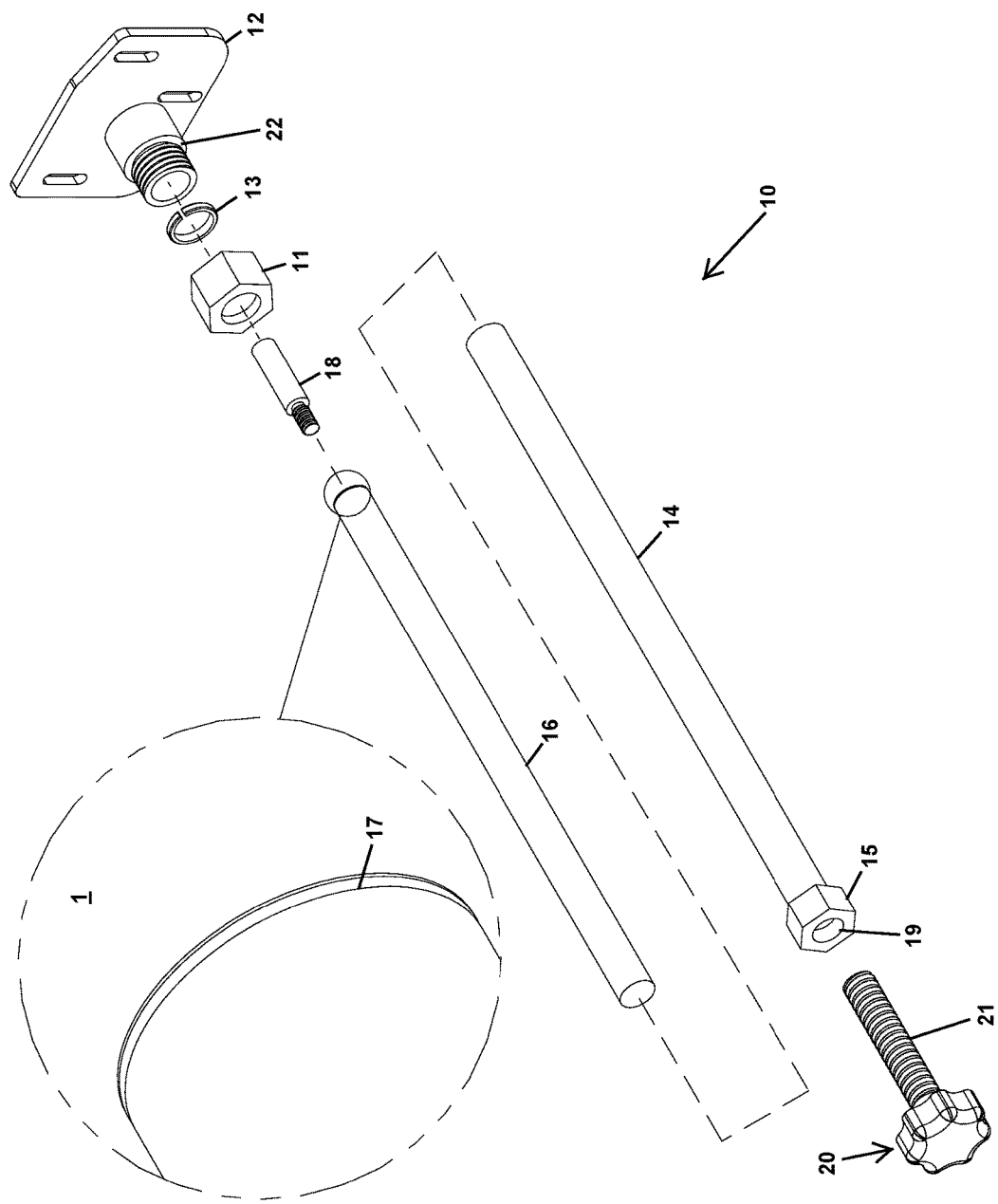
FIG. 1 is a pictorial exploded view of an exemplary wrist pin installation tool 10 for installing piston wrist pins and wrist pin clips in an engine.

FIG. 1 shows the tool structure and use of a wrist pin installation tool 10 for use in installing pistons in horizontally-opposed engines, such as CARRERA, CAYMAN, BOXSTER M96 and M97 engines, 9A1 and 9A2 engines (CARRERA, BOXSTER are trademarks of Volkswagon AG), as well as SUBARU engines (SUBARU is trademark of Fuji Heavy Industries Ltd.). Wrist pin installation tool 10 includes a cylindrical sheath 14, terminated at a proximal end 15 by a fitting that can accept a hexagonal wrench and has a hole 19 with a threaded inner surface for accepting a knob 20 with a threaded portion 21 generally longer than the wrist pin plus the thickness of the wall of a piston in which a wrist pin is to be installed. The tool also includes a rod 16 that in the exemplary embodiment includes a U-shaped groove 17 as shown in callout 1 that is shaped to accommodate a single wrist pin clip. Rod 16 terminates at a distal end with an end portion 18 that in the exemplary embodiment is removable and interchangeable, so that different sizes of piston wrist pins can be installed by wrist pin installation tool 10. Wrist pin installation tool 10 also includes a flange 12 that has a collar 22, which is threaded to accept a cap 11 that, when turned, compresses a conical split washer 13 having the tapered end installed toward collar 22 to secure cylindrical sheath 14 against the wall of the piston. The illustrated components of wrist pin installation tool 10 are generally all machined metal parts, but other parts such as plastic parts of sufficient strength may alternatively be used.

Figure 2:
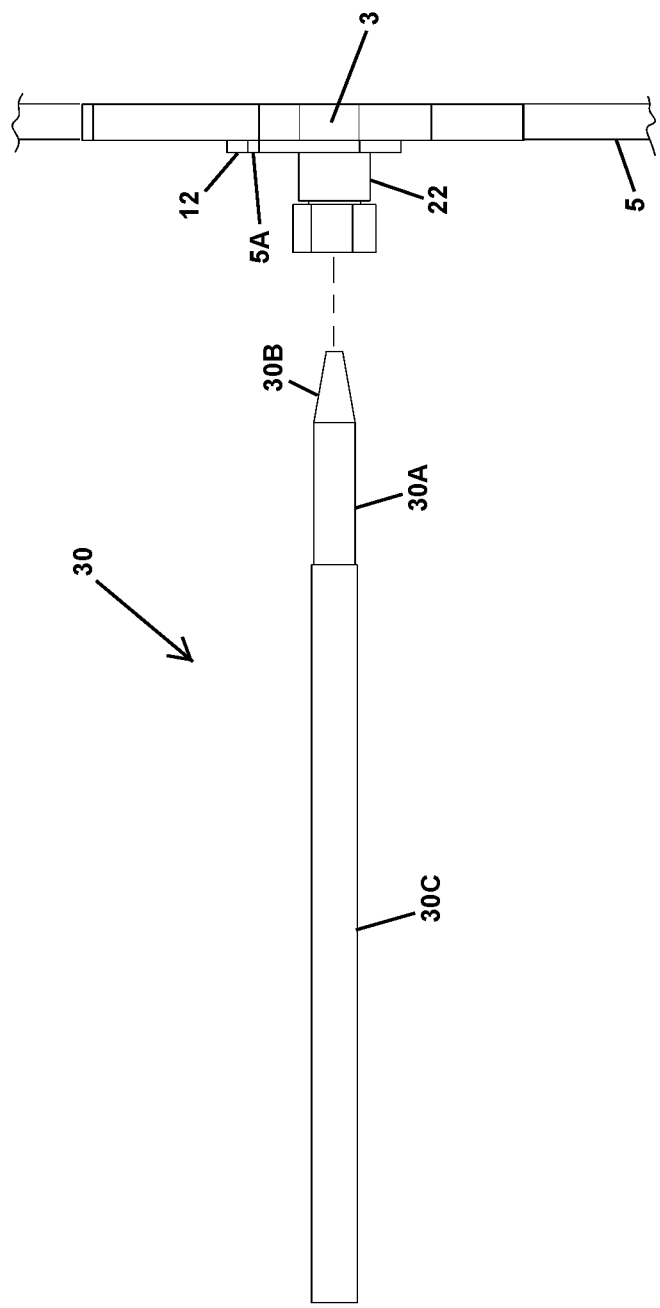
FIG. 2 is a side pictorial view of an alignment tool 30 that can be used to align wrist pin apertures of rods and pistons in an engine prior to installation of the piston wrist pins and wrist pin clips.

Referring now to FIG. 2, an additional alignment tool 30 that can be provided in a tool kit with wrist pin installation tool 10 of FIG. 1, and can be used to start the process of wrist pin and wrist pin clip installation. The exemplary alignment tool 30 is a metal tool having a tapered end portion 30B that is used to move the piston and piston rod to align the piston and piston rod wrist pin apertures by contact as alignment tool 30 is inserted through collar 22 after flange 12 has been bolted to engine block 5 through bolt holes 5A. A middle portion 30A of alignment tool 30 is generally sized to have a diameter slightly smaller than the inside of the wrist pin aperture in the piston and also slightly smaller than the outer diameter of a piston wrist pin, so that alignment tool 30 can be removed without displacing the piston and piston rod. A body portion 30C of alignment tool 30 provides a handle and extension for manipulating alignment tool 30 from outside of an engine block 5 and extending alignment tool 30 to seat in the piston wrist pin aperture of the most distant piston of the engine block with respect to an access hole 3.

Figure 3:
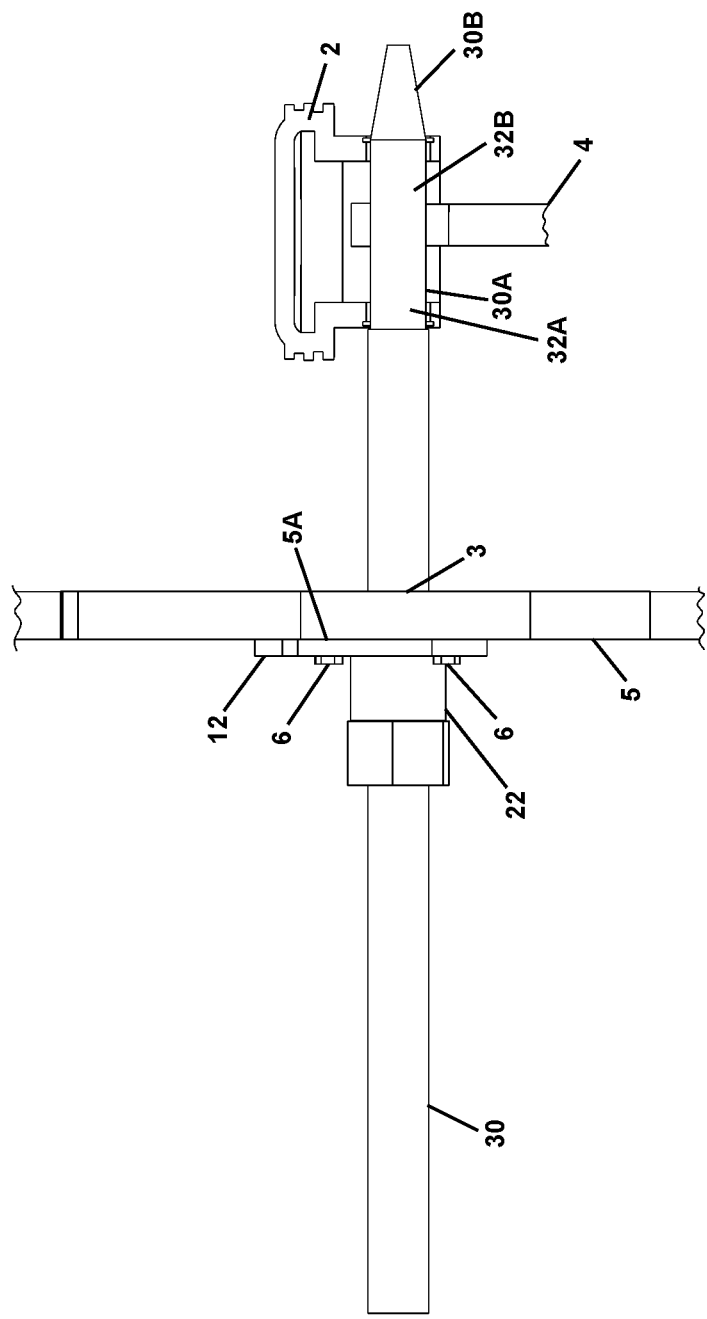
FIG. 3 is a side cross-section view illustrating an alignment process using alignment tool 30.

Referring now to FIGS. 3-7, a piston wrist pin and wrist pin installation process is illustrated, according to an exemplary embodiment of the disclosure. Details of the position of multiple pistons and their corresponding cylinders have been omitted and it is understood that illustrated engine block 5 is a generally solid form with the cylinders defined by voids in the form. Further, the process is illustrated for only one cylinder, and in practice, the farthest cylinder on a given side of the engine has a piston installed first, so that wrist pin installation tool 10 and alignment tool 30 can be moved freely through the cylinder(s) closer to the end of engine block 5 from which installation is being performed. In general, a piston is assembled with one wrist pin clip installed in the position opposite the side of the piston from which the wrist pin installation tool 10 will be used to install a piston wrist pin and a second wrist pin clip that secures the wrist pin in the piston, connecting the piston to the piston rod. The piston rod is pre-installed and attached to the crankshaft, with the outer end of the piston rod positioned within the piston and proximate the wrist pin aperture in the piston. FIG. 3 illustrates initial alignment of a piston 2 and a piston rod 4 using alignment tool 30. Flange 12 is secured to engine block 5 using bolts 6 extending into bolt holes 5A having a pattern that matches preformed threaded holes of engine block 5 around access hole 3 provided through engine block 5. A cap will generally need to be removed from access hole 3 before performing the illustrated operations described below. Collar 22 of flange 12 is centered over access hole 3, so that alignment tool 30 can pass through access hole 3. Alignment tool 30 is further inserted through piston 2 and piston rod 4 so that the wrist pin apertures of piston 2 and piston rod 4, i.e., the holes through which alignment tool 30 extends, are aligned. Middle section 30A of alignment tool 30 is fully within the location where a wrist pin is to be installed. If piston 2 and/or piston rod 4 is initially out of position, tapered end portion 30B will force their wrist pin apertures 32A, 32B into alignment during insertion of alignment tool 30.

Next, as shown in FIGS. 4-5, after alignment tool 30 is removed by sliding alignment tool 30 back out of collar 22, alignment tool 30 is prepared for insertion of a wrist pin and wrist pin clip 34. First, as shown in FIG. 4, a wrist pin clip 34 is compressed into a groove 17 as shown in callout 35A and rod 16 is then slightly retracted into cylindrical sheath 14, so that wrist pin clip 34 is held in a compressed state by the inside wall of cylindrical sheath 14 as shown in callout 35B. A wrist pin 40 is slid onto an end portion 18 of rod 16. If end portion 18 is removable and interchangeable, end portion 18 is attached to the body portion of rod 16 prior to attaching wrist pin 40. As shown in FIG. 5, wrist pin 40 is retracted into cylindrical sheath 14 in preparation for installation in the engine.

Figure 6:
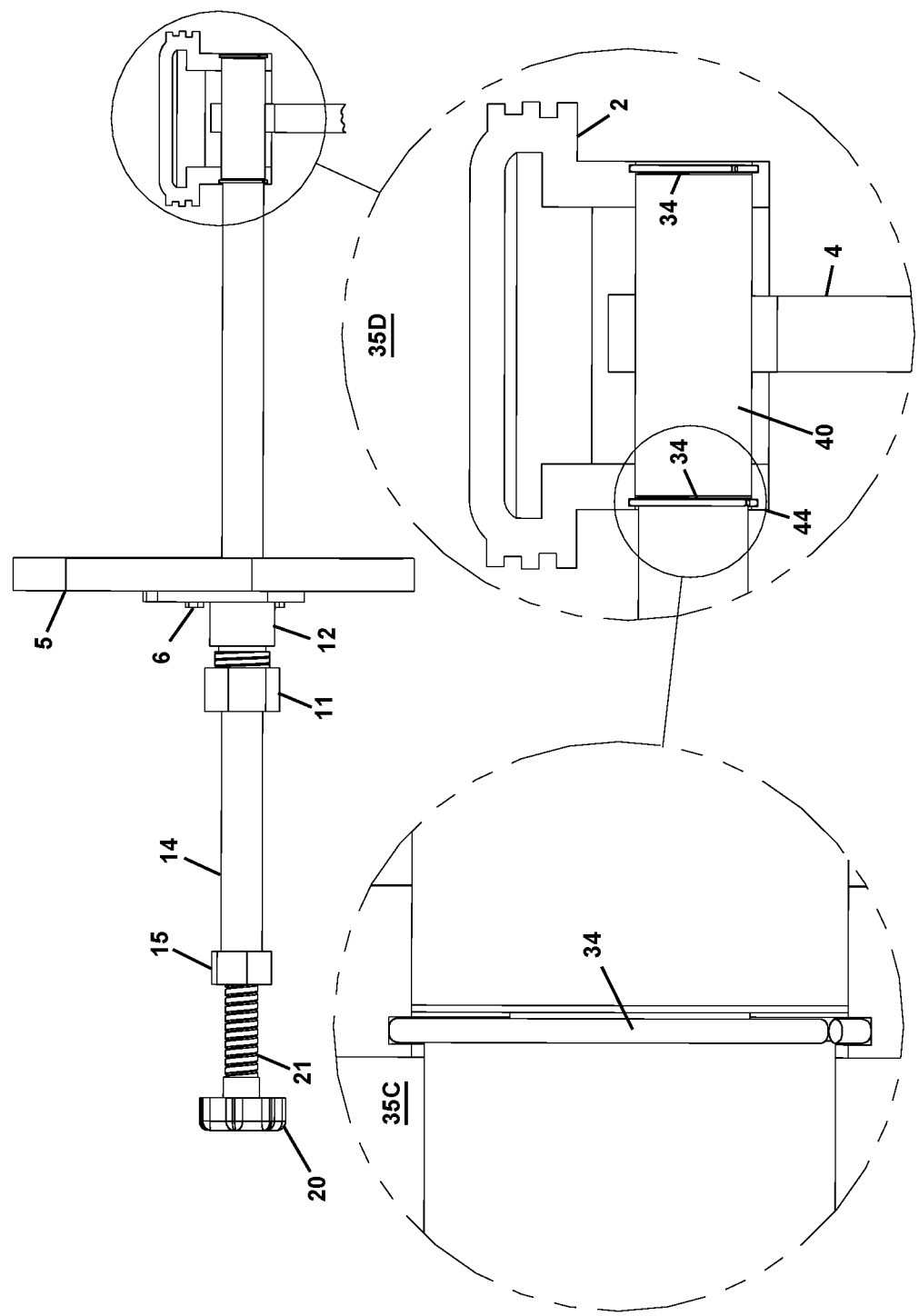
FIG. 6 is a side cross-section view illustrating a wrist pin and wrist pin clip installation process using wrist pin installation tool 10.
Figure 7:
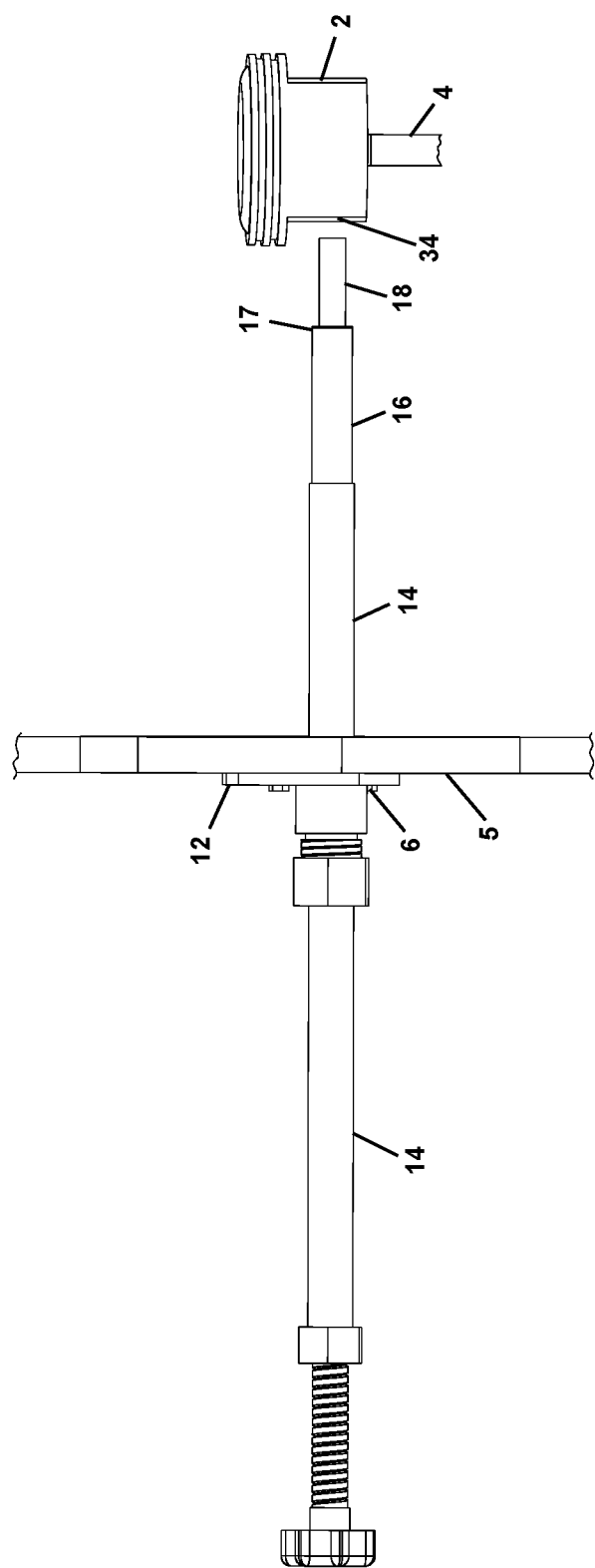
FIG. 7 is a side cross-section view illustrating removal of wrist pin installation tool 10 after installing a wrist pin and wrist pin clip.

Referring now to FIG. 6, cylindrical sheath 14, including a portion of rod 16 and end portion 18, wrist pin clip 34 and wrist pin 40 as assembled in FIG. 5 are inserted through collar 22 and into engine block 5 until cylindrical sheath 14 contacts the outer wall of piston 2. Then knob 20 is turned to move threaded portion 21 into cylindrical sheath 14 moving rod 16 forward, pushing piston wrist pin 40 into piston 2 and through piston rod 4 until wrist pin clip 34 reaches a pre-formed groove 44 in piston 2, at which point wrist pin clip 34 expands and snaps into groove 44, securing wrist pin 40 within piston 2. Details of wrist pin clip 34 in relation to groove 44 are shown in callouts 35C and 35D. Once wrist pin 40 and wrist pin clip 34 are installed, wrist pin installation tool 10 is removed as shown in FIG. 7 by withdrawing the components of wrist pin installation tool 10 from flange 12. Flange 12 is then removed and the access hole cap is replaced.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A tool for installing a piston wrist pin and a wrist pin clip to secure a piston in an engine, the tool comprising:
   a hollow cylindrical sheath having an inner circumference less than a compressed outer circumference of the wrist pin clip when the wrist pin clip is installed, wherein an outer diameter of the cylindrical sheath is less than a diameter of an access hole provided through an outside wall of an engine block of the engine, the access hole positioned so that a wrist pin aperture in a wall of the piston of the engine is alignable with the access hole when the piston is installed within the engine;
   a flange having mounting holes configured for installation of bolts to secure the flange to preformed mounting holes of the engine block, wherein the flange has an integral collar having an inner diameter greater than the outer diameter of the cylindrical sheath, whereby the cylindrical sheath is insertable through the collar to contact the wall of the piston, wherein the collar has a tightening mechanism for securing the cylindrical sheath against the wall of the piston during installation of the wrist pin and the wrist pin clip, wherein the tightening mechanism comprises a threaded cap turned onto exterior threads of the collar and having a hole through a top of the cap having a diameter greater than the outer diameter of the cylindrical sheath and a conical split washer having a conical outer face with a tapered end inserted partially into an end of the collar, whereby when the threaded cap is tightened against the conical split washer, an inner face of the conical split washer tightens against the cylindrical sheath to secure the cylindrical sheath against movement during installation of the piston wrist pin; and
   a rod having a diameter less than an inner diameter of the cylindrical sheath and having an end portion sized to insert within an inner diameter of the piston wrist pin and a body portion sized to slide within the cylindrical sheath, whereby the rod is insertable through the cylindrical sheath with the wrist pin and the wrist pin clip fitted over the end portion with the wrist pin clip at a distal end of the body portion so that when the wrist pin is slid entirely within the piston, the wrist pin clip is released from the cylindrical sheath and expands to secure the piston wrist pin within the piston, whereby the rod and the cylindrical sheath can be slid out from the collar with the secured piston wrist pin remaining installed in the engine.

2. The tool of claim 1, wherein the end portion of the rod is detachable from the body portion of the rod.

3. The tool of claim 1, wherein the distal end of the body portion of the rod terminates in a groove sized to accept the wrist pin clip when the wrist pin clip is compressed to fit within the cylindrical sheath.

4. The tool of claim 3, wherein the groove is a u-shaped groove including walls that prevent movement of the compressed wrist pin clip with respect to the rod during installation.

5. The tool of claim 1, wherein the hole through the top of the cap is threaded and further comprising a threaded knob for pushing the rod within the cylindrical sheath to extend the end portion into the piston to install the wrist pin and the wrist pin clip.

6. A wrist pin installation kit comprising:
   a hollow cylindrical sheath having an inner circumference less than a compressed outer circumference of a wrist pin clip when the wrist pin clip is installed, wherein an outer diameter of the cylindrical sheath is less than a diameter of an access hole provided through an outside wall of an engine block of an engine, the access hole positioned so that a wrist pin aperture in a wall of a piston of the engine is alignable with the access hole when the piston is installed within the engine;
   a flange having mounting holes configured for installation of bolts to secure the flange to pre-formed mounting holes of the engine block, wherein the flange has an integral collar having an inner diameter greater than the outer diameter of the cylindrical sheath, whereby the cylindrical sheath is insertable through the collar to contact the wall of the piston, wherein the collar has a tightening mechanism for securing the cylindrical sheath against the wall of the piston during installation of the wrist pin and the wrist pin clip, wherein the tightening mechanism comprises a threaded cap turned onto exterior threads of the collar and having a hole through a top of the cap having a diameter greater than the outer diameter of the cylindrical sheath and a conical split washer having a conical outer face with a tapered end inserted partially into the end of the collar, whereby when the threaded cap is tightened against the conical split washer, an inner face of the conical split washer tightens against the cylindrical sheath to secure the cylindrical sheath against movement during installation of the piston wrist pin;
   a rod having a diameter less than an inner diameter of the cylindrical sheath and having an end portion sized to insert within an inner diameter of a piston wrist pin and a body portion sized to slide within the cylindrical sheath, whereby the rod is insertable through the cylindrical sheath with the wrist pin and the wrist pin clip fitted over the end portion with the wrist pin clip at a distal end of the body portion so that when the wrist pin is slid entirely within the piston, the wrist pin clip is released from the cylindrical sheath and expands to secure the piston wrist pin within the piston, whereby the rod and the cylindrical sheath can be slid out from the collar with the secured piston wrist pin remaining installed in the engine; and
   an alignment tool having a tapered end for insertion within the collar for aligning the wrist pin aperture of the piston with the access hole prior to installation of the wrist pin and the wrist pin clip using the cylindrical sheath and the rod.

7. The wrist pin installation kit of claim 6, wherein the alignment tool is a contiguous piece having the tapered end at a distal portion thereof for moving the piston to align the wrist pin aperture with the access hole, a middle portion having a diameter sized to fit within the wrist pin aperture to complete the alignment and a proximal portion having a diameter greater than a diameter of the wrist pin aperture and less than the inner diameter of the collar so that the alignment tool can be slid within the collar.

8. The wrist pin installation kit of claim 6, wherein the end portion of the rod is detachable from the body portion of the rod.

9. The wrist pin installation kit of claim 6, wherein the distal end of the body portion of the rod terminates in a groove sized to accept the wrist pin clip when the wrist pin clip is compressed to fit within the cylindrical sheath.

10. The wrist pin installation kit of claim 6, wherein the groove is a u-shaped groove including walls that prevent movement of the compressed wrist pin clip with respect to the rod during installation.

11. The wrist pin installation kit of claim 6, wherein the hole through the top of the cap is threaded and further comprising a threaded knob for pushing the rod within the cylindrical sheath to extend the end portion into the piston to install the wrist pin and the wrist pin clip.

12. A method of installing a wrist pin and wrist pin clip in a piston of an engine:
    assembling the piston and corresponding rod within the engine;
    aligning a wrist pin aperture of the piston with an access hole provided through an outside wall of an engine block of the engine and positioned to access a wrist pin aperture of the piston using a tool having a cylindrical sheath with an inner circumference less than a compressed outer circumference of the wrist pin clip when the wrist pin clip is installed, wherein an outer diameter of the cylindrical sheath is less than the diameter of the access hole;
    mounting a flange of the tool to the engine block by bolting the flange through preformed mounting holes of the engine block, wherein the flange has an integral collar having an inner diameter greater than an outer diameter of the cylindrical sheath;
    inserting a hollow cylindrical sheath having an inner circumference less than a compressed outer circumference of an installed wrist pin clip into the engine block and against the wrist pin aperture of the piston;
    inserting a rod having a diameter less than an inner diameter of the cylindrical sheath and having an end portion sized to insert within an inner diameter of a piston wrist pin and a body portion sized to slide within the cylindrical sheath into the cylindrical sheath with the wrist pin and the wrist pin clip fitted over the end portion with the wrist pin clip at a distal end of the body portion;
    tightening a tightening mechanism to secure the cylindrical sheath against the wall of the piston during the inserting of the cylindrical sheath and the rod, wherein the tightening mechanism comprises a threaded cap turned onto exterior threads of the collar and having a hole through a top of the cap having a diameter greater than the outer diameter of the cylindrical sheath and a conical split washer having a conical outer face with a tapered end inserted partially into the end of the collar, whereby when the threaded cap is tightened against the conical split washer, an inner face of the conical split washer tightens against the cylindrical sheath to secure the cylindrical sheath against movement during installation of the piston wrist pin;
    sliding the wrist pin entirely into the piston, releasing the wrist pin clip from the cylindrical sheath so that the wrist pin clip expands to secure the piston wrist pin within the piston; and
    sliding the rod and the cylindrical sheath out from the collar with the secured piston wrist pin remaining installed in the engine.

13. The method of claim 12, wherein the end portion of the rod is detachable from the body portion of the rod, the method further comprising:
    selecting an end portion from a set of end portions sized to accommodate piston wrist pins of differing sizes; and
    installing the end portion on the rod prior to fixing the wrist pin and the wrist pin clip over the end portion.

14. The method of claim 12, wherein the distal end of the body portion of the rod terminates in a groove sized to accept the wrist pin clip when the wrist pin clip is compressed to fit within the cylindrical sheath, and wherein the installing comprises placing the wrist pin clip in the groove while compressing the wrist pin clip and sliding the distal end of the body portion of the rod into the cylindrical sheath.

15. The method of claim 14, wherein the groove is a u-shaped groove including walls that prevent movement of the compressed wrist pin clip with respect to the rod during installation.

* * * * *